United States Patent Office 2,962,473
Patented Nov. 29, 1960

2,962,473

PROCESS FOR STABILIZING HALOGENATED BUTYL RUBBER AGAINST GELATION WITH MAGNESIUM OXIDE, AND STABILIZED PRODUCT OBTAINED THEREBY

Francis P. Baldwin, Colonia, and Thomas H. Hakala, Union, N.J., assignors to Esso Research and Engineering Company, a corporation of Delaware No Drawing. Filed Mar. 5, 1957, Ser. No. 643,929

4 Claims. (Cl. 260—45.7)

This invention relates to the stabilization of rubbery polymeric compositions containing partially halogenated copolymers of isoolefins and multiolefins, particularly chlorinated or brominated butyl rubber.

Butyl rubber copolymers comprise a major proportion (preferably about 85 to 99.5 weight percent) of a $C_4$ to $C_8$ isoolefin such as isobutylene, 2-methyl-butene-1 or 3-methyl-butene-1, etc., with a minor proportion (preferably about 15 to 0.5 weight percent) of a multiolefin of about 4 to 14, preferably about 4 to 6 carbon atoms and are commonly referred to in patents and technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0 parts by weight, preferably about 0.2 to 5.0 parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc. Such a copolymer has a Staudinger molecular weight of between about 20,000 and 300,000, and a mole percent unsaturation of between about 0.5 and 15.0.

In accordance with the present invention, it has now been found that while isoolefin-multiolefin copolymers such as butyl rubber do not respond to stabilization by magnesium oxide, the halogenated derivatives of these copolymers are surprisingly improved by magnesium oxide as to decreased gelation as exemplified by good hexane solubility and particularly as to resistance to dehydrohalogenation as exemplified by low corrosion of tin plate. The tensile strength of vulcanizates of such stabilized halogenated rubbery copolymers are also increased.

The halogenated rubbery isoolefin-multiolefin copolymers are produced by carefully chlorinating or brominating these copolymers in a manner which does not substantially degrade the molecular weight thereof. More particularly, in producing halogenated butyl rubber, the halogenation is regulated so that the resulting rubber will contain at least about 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloroaceto-acetanilide, N,N'-dichloro-5,5 dimethylhydantoin, iodine halides, trichlorophenol chloride, N-chloroacetamide, beta-bromo-methyl phthalimide, etc. The preferred halogenating agents are gaseous chlorine, liquid bromine, sulfuryl chloride, sulfuryl bromide, chlorohydantoins, bromo-hydantoins, iodine monochloride, and related materials.

The halogenation is generally conducted at temperatures of above about 0° to about +100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 weight percent solution of such copolymers as above, in a substantially inert liquid organic solvent such as a $C_3$ to $C_{10}$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the halogenating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated copolymer and dried under about 1 to 760 millimeters or higher of mercury pressure absolute at about 0° to 180° C., preferably about 50° to 150° C. (e.g. 70° C.). Other methods of recovering the halogenated polymer are by conventional spray or drum drying techniques. Alternatively, the solution of the halogenated butyl rubber may be injected into a vessel containing steam and/or agitated water heated to a temperature sufficient to volatilize the solvent and form an aqueous slurry of the halogenated butyl rubber. This halogenated butyl rubber may then be separated from the slurry by filtration and drying and recovered as a "crumb" or as a dense sheet or slab by conventional hot milling and/or extruding procedures. As so produced the halogenated rubbery copolymer has a Staudinger molecular weight within the range of approximately 20,000 to 300,000, preferably about 25,000 to 200,000, and a mole percent unsaturation of about 0.5 to 15.0.

The resulting halogenated copolymer may be vulcanized by sulfur and/or zinc oxide and/or primary or polyfunctional amines, with or without added vulcanization accelerators, fatty acids such as stearic acid, etc. The vulcanizates and covulcanizates with other rubbery polymers such as natural rubber and GR–S rubber have been found to exhibit good stress-strain properties and to have superior heat aging resistance compared to the corresponding unhalogenated copolymers. Since these halogenated copolymers already possess heat aging resistance superior to the unhalogenated copolymers, and the unhalogenated copolymers are not improved as to heat aging resistance by the addition thereto of magnesium oxide, it is most unexcepted that magnesium oxide has now been found to even further improve the heat aging resistance of the halogenated copolymers.

In practicing the present invention, the resulting unvulcanized halogenated isoolefin-multiolefin-containing copolymer, prior to compounding and curing, is blended, at a temperature level of between about 0° and 200° C., preferably between about 20° and 150° C., with about 0.05 to 20, advantageously about 0.1 to 10.0, preferably about 0.2 to 5.0 weight percent based on halogenated copolymer of magnesium oxide. This may be accomplished in several manners. In a preferred embodiment of the invention substantially all of the magnesium oxide required is blended with the unvulcanized halogenated copolymer slurry when it is recovered (i.e., precipitated and/or injected into a hot aqueous medium) but prior to the drying, milling and/or extruding steps. In another preferred embodiment, the magnesium oxide is added to the halogenated copolymer solution prior to recovering the copolymer by spray drying and/or drum drying and/or precipitation and/or injection into a hot aqueous medium. Alternatively, the magnesium oxide may be added on a cold mill or Banbury prior to vulcanization. However, it is especially desirable to blend with the halogenated copolymer at least 0.5 or 1.0 part, per hundred parts of copolymer, of magnesium oxide prior to such finishing operations as spray drying, drum drying, hot milling, extruding or calendering since the magnesium oxide substantially prevents dehydrohalogenation, cross linking or gelling and degradation or breakdown of the halogenated copolymer during these operations.

The foregoing compositions comprising halogenated isoolefin-multiolefin-containing copolymers and magnesium oxide may be hot-milled, extruded, calendered or dried with facility, in accordance with conventional practice, without substantial dehydrohalogenation, gelation, or thermal degradation. One hundred parts by weight of these resulting compositions are then advantageously compounded with about 10 to 150 parts by weight of a filler or fillers; about 1 to 30 parts by weight of zinc oxide and/or primary or polyfunctional amines and/or about 0.5 to 10.0 parts by weight of sulfur; plasticizers such as hydrocarbon oils, tars, waxes, resins or organic esters; pigments such as carbon blacks or TiO₂; fillers such as CaO; additional magnesium oxide; quinone dioxime or its derivatives or homologues; and accelerators such as mercaptobenzothiazole, benzothiazyl disulfide, etc. The compounded stock formed may then be vulcanized at temperatures of between about 200° and 450° F., preferably about 250° to 400° F., for times between about a few seconds and several hours.

The stabilized, halogenated isoolefin-multiolefin copolymers may also be cured by zinc oxide and/or primary or polyfunctional amines in the presence of minor proportions of resinous polymerized hydroxy aromatic (or heterocyclic) dialcohol compounds, particularly about 0.1 to 20, preferably about 0.5 to 10.0 weight percent of dimethylol phenolic resins. The foregoing dialcohol resins are produced by heating the monomeric phenol dialcohol at temperatures of between about 75° and 175° C.; (e.g., 125° C.), care being taken to terminate the reaction while the resin is in the soluble (i.e., in organic solvents) and fusible state. The stabilized, halogenated butyl rubber may also be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the rubber is compounded and cured. Vulcanizates or covulcanizates of these types are especially useful in tires (especially in the carcass, undertread and bead areas), in tire casing curing bags or diaphragms, in transmission and conveyor belting, and in steam hose or similar articles. The vulcanization conditions for such compositions are generally as hereinbefore mentioned.

In order to more fully illustrate the present invention, the following experimental data are given.

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added at room temperature. The resulting chlorinated interpolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

CHLORINATED RUBBERS "B" TO "L"

Other examples of halogenated isoolefin-multiolefin copolymers are as follows, the amount of isoolefin and multiolefin in copolymer, halogenation agent, and amount of halogen combined in the copolymer being tabulated hereinafter:

| Halogenated Butyl Rubber | Isoolefin (Percent)[1] | Multiolefin (Percent)[1] | Halogenation Agent | (Percent) Halogen in the Butyl Rubber[1] |
|---|---|---|---|---|
| B | Isobutylene (98) | Isoprene (2) | SO₂Cl₂ | 1.2 chlorine. |
| C | Isobutylene (95) | Isoprene (5.0) | Cl₂ in CCl₄ | 2.5 chlorine. |
| D | Isobutylene (94) | Cyclopentadiene (6) | Cl₂ in CCl₄ | 2.0 chlorine. |
| E | Isobutylene (92) | Myrcene (8.0) | Cl₂ in CCl₄ | 1.6 chlorine. |
| F | 2-methylbutene-1 (95) | Isoprene (5) | Cl₂ in Hexane | 1.5 chlorine. |
| G | 3-methylbutene-1 (96) | Butadiene (4) | Cl₂ in Hexane | 1.9 chlorine. |
| H | Isobutylene (98) | 1-vinyl cyclohexene-3 (2) | Cl₂ in CCl₄ | 0.8 chlorine. |
| I | Isobutylene (92) | Butadiene (8) | Gaseous chlorine | 2.8 chlorine. |
| J | Isobutylene (85) | Isoprene (15) | Gaseous chlorine | 6.6 chlorine. |
| K | Isobutylene (98) | Isoprene (2) | N-N'-dichloro-5,5-dimethyl hydantoin. | 1.1 chlorine. |
| L | Isobutylene (98) | Isoprene (2) | Liquid bromine | 2.3 bromine. |

[1] Note.—(Percent) in all instances is percent by weight.

CHLORINATED BUTYL RUBBER "M"

An additional run was made chlorinating a commercial butyl rubber having a Mooney viscosity at 212° F. for 8 minutes of 75, and a mole percent unsaturation of 1.6 dissolved in benzene. The chlorination of a solution of the uncured butyl rubber was conducted in a 500-gallon glass-lined Pfaudler reactor equipped with an agitator, baffle, submerged stainless steel sparger ring and a conduit leading into the ring.

Gaseous chlorine was continuously added through the conduit via the sparger ring to the butyl rubber solution over a period of ½ hour at a temperature level of 30° C. and under atmospheric pressure. The chlorination was then terminated and the solution containing the chlorinated butyl rubber formed was agitated for an additional 15 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds Added | Percent in the final polymer |
|---|---|---|
| Butyl rubber | 170 | 98.70 |
| Benzene solvent | 1,540 | |
| Chlorine | 4.8 (i.e. 2.8%) | 1.30 |

The resulting water-washed solution containing chlorinated rubbery butyl rubber "M" was then injected into 6140 lbs. of an agitated aqueous solution containing 0.5 weight percent based on chlorinated butyl rubber of an aliphatic polyoxyethylene ether type wetting agent (i.e. Sterox A.J.), the temperature being maintained at a level of between about 190° and 210° F. (e.g. 200° F.) whereby to flash off the benzene solvent and form an aqueous slurry of the chlorinated butyl rubber in water. This slurry was then filtered, and the chlorinated butyl rubber, which was in the form of a wet "crumb," was placed in a Proctor and Schwartz tray drier maintined at 180° F. (i.e., 82° C.) and dried for ten hours. The crumb depth on the tray was about ½ inch. The crumb was then completely dried and compacted by milling for 10 minutes on a conventional rubber mill having a roll temperature of 260° F. (i.e. 127° C.).

*Example I*

One hundred parts by weight of chlorinated butyl rubber "M" were compounded on a cold mill (e.g. 20° C.) with the various amounts of MgO in parts by weight, per 100 parts by weight of chlorinated butyl rubber, indicated hereinafter. Portions of the respective blends were placed on tin plate and aged for 30 minutes in a circulating air oven at 295° F. HCl evolution was evidenced by corrosion of the tinplate and gelation was evidenced by incomplete solubility in hexane compared to a control of chlorinated butyl rubber "M" containing no added stabilizer. The results were as follows:

| Run | Parts by weight of Stabilizer (MgO) | Tin plate corrosion | Solubility in hexane |
|---|---|---|---|
| 1 | None (i.e., control) | Severe | Insoluble. |
| 2 | 0.25 | None | Soluble. |
| 3 | 0.50 | do | Do. |
| 4 | 1.00 | do | Do. |
| 5 | 2.00 | do | Do. |

The above data show that magnesium oxide stabilizes chlorinated butyl rubber against dehydrohalogenation and gelation in accordance with the present invention.

*Example II*

One hundred parts by weight of portions of the heat aged products of runs 1 and 2 were each compounded with 50 parts by weight of SRF carbon black, 5 parts by weight of zinc oxide, 1 part by weight of stearic acid, 1 part by weight of tellurium diethyl dithiocarbamate and 2 parts by weight of sulfur and cured for 60 minutes at 300° F. The vulcanizates formed had the following physical inspections:

|  | Run 1 | Run 2 |
|---|---|---|
| Magnesium oxide added | No | Yes |
| Modulus at 300% elong. (p.s.i.) | 1,675 | 1,700 |
| Tensile strength (p.s.i.) | 2,095 | 2,285 |
| Elongation (Percent) | 400 | 420 |

The above data show that the vulcanizate of run 2 stabilized with magnesium oxide in accordance with the present invention has improved tensile strength without loss in either modulus or elongation compared to the control (run 1) which had not been stabilized with magnesium oxide.

Resort may be had to various modifications and variations of the disclosed specific embodiments without departing from the spirit of the invention or the scope of the appended claims.

What is claimed is:

1. In a process for preparing a copolymer of 85 to 99.5% of a $C_4$ to $C_8$ isoolefin with 15 to 0.5% of a $C_4$ to $C_{14}$ multiolefin containing at least about 0.5 weight percent of combined halogen in its structure which has been recovered from a water slurry; the improvement which comprises blending said copolymer with 0.01 to 10 weight percent of magnesium oxide at a temperature between 0 and 200° C. prior to recovery from said slurry to provide a copolymer therefrom stabilized against gelation.

2. In a process for preparing a copolymer of 85 to 99.5% isobutylene with 15 to 0.5% isoprene containing at least about 0.5 weight percent of combined chlorine in its structure which has been recovered from a water slurry; the improvement which comprises blending said polymer with 0.01 to 10 weight percent of magnesium oxide at a temperature between 0 to 200° C. prior to recovery from said slurry to provide a copolymer therefrom stabilized against gelation; said stabilized chlorinated copolymer being capable of being subsequently compounded with 10 to 50 parts by weight of fillers, 0.5 to 10 parts by weight of sulfur, 0.5 to 3.0 parts by weight of accelerators, 2 to 30 parts by weight of zinc oxide, 0.1 to 2.0 parts by weight of stearic acid and cured at a temperature between 200° and 450° F. for about 30 second to 2 hours.

3. A composition stabilized against gelation which comprises a halogenated copolymer of 85 to 99.5% of a $C_4$ to $C_8$ isoolefin with 15 to 0.5% of a $C_4$ to $C_{14}$ multiolefin which has been recovered from a water slurry; said copolymer containing at least 0.5 weight percent of combined halogen in its structure; said halogenated copolymer having been blended with 0.01 to 10 weight percent of magnesium oxide at a temperature between 0 and 200° C. prior to recovery from said slurry.

4. A composition stabilized against gelation which comprises a halogenated copolymer of 85 to 99.5% isobutylene with 15 to 0.5% isoprene which has been recovered from a water slurry; said copolymer containing at least 0.5 weight percent of combined halogen in its structure; said halogenated copolymer having been blended with 0.01 to 10 weight percent of magnesium oxide at a temperature between 0 and 200° C. prior to recovery from said slurry; said stabilized copolymer being capable of being subsequently compounded with 10 to 50 parts by weight of fillers, 0.5 to 10 parts by weight of sulfur, 0.5 to 3.0 parts by weight of accelerators, 2 to 30 parts by weight of zinc oxide, 0.1 to 2.0 parts by weight of stearic acid and being cured at a temperature between 200° and 450° F. for about 30 seconds to 2 hours.

References Cited in the file of this patent

UNITED STATES PATENTS

| 2,402,020 | Cislak et al. | June 11, 1946 |
| 2,411,840 | Calvert | Nov. 26, 1946 |
| 2,541,550 | Sarbach et al. | Feb. 13, 1951 |
| 2,631,984 | Crawford et al. | Mar. 17, 1953 |
| 2,732,354 | Morrissey et al. | Jan. 24, 1956 |
| 2,857,357 | Smith | Oct. 21, 1958 |